No. 856,485. PATENTED JUNE 11, 1907
W. S. MORGAN.
HAND FERTILIZER DISTRIBUTER.
APPLICATION FILED FEB. 25, 1907.
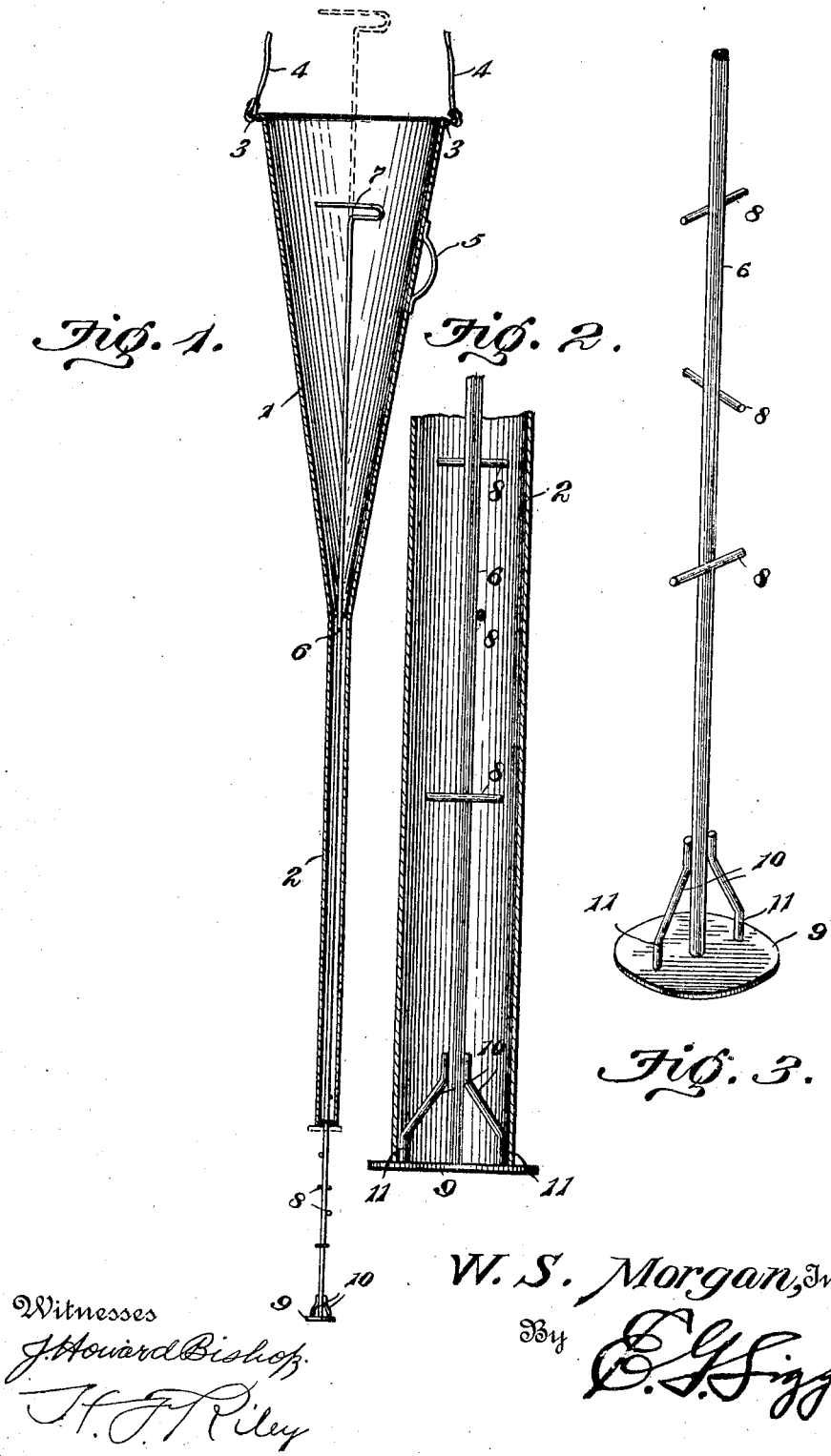
W. S. Morgan, Inventor.

UNITED STATES PATENT OFFICE.

WINDFREY SCOTT MORGAN, OF LEWISVILLE, ARKANSAS.

HAND FERTILIZER-DISTRIBUTER.

No. 856,485.

Specification of Letters Patent.

Patented June 11, 1907.

Application filed February 25, 1907. Serial No. 359,207.

*To all whom it may concern:*

Be it known that I, WINDFREY SCOTT MORGAN, a citizen of the United States, residing at Lewisville, in the county of Lafayette and State of Arkansas, have invented a new and useful Hand Fertilizer-Distributer, of which the following is a specification.

The invention relates to improvements in hand fertilizer distributers.

The object of the present invention is to improve the construction of hand fertilizer distributers, and to provide a simple, inexpensive and efficient one of great strength and durability, adapted to be conveniently carried and capable of easy operation to discharge the desired quantity of fertilizer.

With these and other objects in view, the invention consists in the construction and novel combination of parts hereinafter fully described, illustrated in the accompanying drawing, and pointed out in the claims hereto appended; it being understood that various changes in the form, proportion, size and minor details of construction, within the scope of the claims, may be resorted to without departing from the spirit or sacrificing any of the advantages of the invention.

In the drawing:—Figure 1 is a vertical sectional view of a hand fertilizer distributer, constructed in accordance with this invention. Fig. 2 is an enlarged vertical sectional view of the lower portion of the device, the discharge tube being closed by the disk of the operating rod. Fig. 3 is an enlarged detail perspective view of the operating rod.

Like numerals of reference designate corresponding parts in all the figures of the drawing.

1 designates an inverted conical hopper, having its lower end open and connected thereat with a cylindrical discharge tube 2, which is suitably secured to the hopper, and which depends therefrom, as clearly illustrated in Fig. 1 of the drawing.

The hopper, which has an open top or mouth, is provided at opposite sides with eyes or loops 3, to which are connected the terminals of a suitable strap 4, or other flexible connection, adapted to be placed around the neck of the operator for supporting the hand fertilizer distributer from the shoulders of the person using it. The hopper is also provided with an exterior handle 5, located at a point between the top and bottom of the hopper in convenient position to be grasped with the left hand.

The discharge of fertilizer is controlled by a longitudinal operating rod 6, extending through the cylindrical discharge tube and projecting slightly above the hopper, when at the limit of its upward movement. The upper end of the operating rod is bent to form a suitable handle 7, which is grasped by the operator with his right hand, and which enables the rod to be readily reciprocated to discharge the fertilizer. The operating rod is provided at intervals with laterally projecting fingers, consisting of short transverse rods 8, centrally attached to the operating rod, and adapted to feed the fertilizer downward, when the operating rod is reciprocated. By varying the length of the stroke of the operating rod, the discharge of fertilizer may be controlled, and the desired quantity of the same may be readily dropped at each operation of the device.

The operating rod is provided at its lower end with a flat disk 9, centrally secured to the lower end of the rod 6 and connected at diametrically opposite points with the rods by means of upwardly converging combined guides and braces 10. The combined guides and braces 10 consist of short rods, suitably secured at their lower ends to the flat disk and having their upper ends attached to the operating rod at opposite sides thereof. The bracing rods 10 are provided at the lower terminals of the converging portions with straight parallel portions 11, arranged perpendicular to the upper face of the disk or plate 9, and adapted to engage the interior of the lower end of the conical discharge tube at diametrically opposite points, when the flat disk is closed, whereby the latter is held against the transverse movement and forms an efficient closure for the device. The upwardly converging portions guide the disk or plate to its position concentric with the lower end of the discharge tube. When the device is filled, it is placed upon the ground or other supporting surface, which automatically closes the lower end of the discharge tube.

Having thus fully described my invention, what I claim as new and desire to secure by Letters Patent, is:—

A hand fertilizer distributer comprising a hopper provided with a depending tube, an operating rod extending through the tube and having agitating means for engaging the fertilizer, a flat plate connected to the lower end of the operating rod and arranged to fit against the lower end of the discharge tube to form a closure for the same, and combined bracing rods and guides connecting the opposite portions of the plate with the operating rod and consisting of upper converging portions and lower parallel portions, the latter being adapted to engage the interior of the discharge tube for holding the plate against lateral movement when the discharge tube is closed.

In testimony, that I claim the foregoing as my own, I have hereto affixed my signature in the presence of two witnesses.

WINDFREY SCOTT MORGAN.

Witnesses:
J. O. SMITH,
D. W. GLADNEY.